US007474705B2

(12) United States Patent
Shor et al.

(10) Patent No.: US 7,474,705 B2
(45) Date of Patent: Jan. 6, 2009

(54) SCALABLE ULTRA-WIDE BAND COMMUNICATION SYSTEM

(75) Inventors: Gadi Shor, Tel-Aviv (IL); David Yaish, Tel-Aviv (IL); Yaron Knobel, Givat-Shmuel (IL); Sorin Goldenberg, Ness-Ziona (IL); Benny Blumer, Kfar-Saba (IL); Rafi Zack, Givat-Shmuel (IL)

(73) Assignee: Wisair Ltd, Ramat Hachayal (IL)

( * ) Notice: Subject to any disclaimer, the term of this patent is extended or adjusted under 35 U.S.C. 154(b) by 453 days.

(21) Appl. No.: 10/642,886

(22) Filed: Aug. 18, 2003

(65) Prior Publication Data

US 2004/0077306 A1 Apr. 22, 2004

Related U.S. Application Data

(63) Continuation-in-part of application No. 10/389,789, filed on Mar. 17, 2003.

(60) Provisional application No. 60/450,737, filed on Feb. 28, 2003, provisional application No. 60/404,070, filed on Aug. 16, 2002.

(51) Int. Cl.
*H04L 27/04* (2006.01)
*H04B 1/69* (2006.01)

(52) U.S. Cl. ........................ 375/295; 375/130

(58) Field of Classification Search ................ 375/130, 375/132, 138, 239, 295; 341/177, 178, 180–182
See application file for complete search history.

(56) References Cited

U.S. PATENT DOCUMENTS

| 5,177,767 A | 1/1993 | Kato |
| 5,206,881 A | 4/1993 | Messenger et al. |
| 5,218,620 A | 6/1993 | Mori et al. |
| 5,323,419 A | 6/1994 | Mori et al. |
| 5,347,537 A | 9/1994 | Mori et al. |
| 5,677,927 A | 10/1997 | Fullerton et al. |
| 5,960,031 A | 9/1999 | Fullerton et al. |
| 5,963,581 A | 10/1999 | Fullerton et al. |
| 5,995,534 A | 11/1999 | Fullerton et al. |
| 6,002,707 A | 12/1999 | Thue |
| 6,026,125 A | 2/2000 | Larrick, Jr. et al. |
| 6,031,862 A | 2/2000 | Fullerton et al. |
| 6,075,807 A | 6/2000 | Warren et al. |
| 6,351,652 B1 | 2/2002 | Finn et al. |
| 6,952,456 B1 * | 10/2005 | Aiello et al. ........... 375/295 |
| 7,088,795 B1 * | 8/2006 | Aiello et al. ........... 375/356 |
| 2002/0054622 A1 * | 5/2002 | Sudo et al. ........... 375/147 |

(Continued)

FOREIGN PATENT DOCUMENTS

EP    0889 600AS    1/1999

(Continued)

*Primary Examiner*—Khai Tran
(74) *Attorney, Agent, or Firm*—Reches Patents

(57) ABSTRACT

The present invention provides multi-band ultra-wide band (UWB) communication methods and systems capable of adaptively and scalably supporting different applications with different requirements, as well as different desired or ideal properties relating to the communications. A method is provided for transmitting information using multi-band ultra-wide band transmission, including transmitting a signal over each of multiple frequency sub-bands, and allowing variation of at least one transmission parameter to facilitate trade-off between at least two of power consumption, energy collection, bit rate, performance, range, resistance to multiple access interference, and resistance to multipath interference and spectral flatness.

31 Claims, 14 Drawing Sheets

U.S. PATENT DOCUMENTS

| | | | |
|---|---|---|---|
| 2002/0130811 A1* | 9/2002 | Voigtlaender et al. | 342/159 |
| 2002/0150152 A1* | 10/2002 | Greszczuk et al. | 375/219 |
| 2003/0002566 A1* | 1/2003 | McDonough et al. | 375/147 |
| 2003/0026200 A1* | 2/2003 | Fu et al. | 370/208 |
| 2003/0043766 A1* | 3/2003 | McDonough et al. | 370/335 |
| 2003/0193430 A1* | 10/2003 | Gresham et al. | 342/70 |
| 2004/0013166 A1* | 1/2004 | Goodings | 375/131 |
| 2004/0013167 A1* | 1/2004 | Jones | 375/132 |
| 2004/0022304 A1* | 2/2004 | Santhoff et al. | 375/219 |
| 2004/0077306 A1* | 4/2004 | Shor et al. | 455/1 |

FOREIGN PATENT DOCUMENTS

| | | |
|---|---|---|
| JP | 2-137533 | 5/1990 |
| JP | 11-27180 | 1/1999 |
| JP | 11-284599 | 10/1999 |
| JP | 11-313005 | 11/1999 |
| WO | WO01/11814 A1 | 2/2001 |
| WO | WO01/39451 A1 | 5/2001 |
| WO | WO01/93441 A1 | 12/2001 |
| WO | WO01/99300 A2 | 12/2001 |

* cited by examiner

|    | 1 | 2 | 3 | 4 | 5 | 6 | 7 |
|----|---|---|---|---|---|---|---|
| S1 | 1 | 2 | 3 | 4 | 5 |   | 6 | 7 |
| S2 | 1 | 3 | 5 | 7 | 2 |   | 4 | 6 |
| S3 | 1 | 4 | 7 | 3 | 6 |   | 2 | 5 |
| S4 | 1 | 5 | 2 | 6 | 3 |   | 7 | 4 |
| S5 | 1 | 6 | 4 | 2 | 7 |   | 5 | 3 |
| S6 | 1 | 7 | 6 | 5 | 4 |   | 3 | 2 |

Fig. 7

| | | | | | | | | | | | | | | | | | | | | | |
|---|---|---|---|---|---|---|---|---|---|---|---|---|---|---|---|---|---|---|---|---|---|
| Full Rate | 1 | 3 | 5 | 7 | 2 | 4 | 6 | 1 | 3 | 5 | 7 | 2 | 4 | 6 | 1 | 3 | 5 | 7 | 2 | 4 | 6 |
| Half Rate | 1 |   | 5 | 7 | 2 |   | 6 |   | 3 |   | 7 |   | 4 |   | 1 |   | 5 |   | 2 |   | 6 |
| Low Rate  | 1 |   |   |   |   |   | 6 |   |   | 5 |   | 4 |   |   |   | 3 |   |   | 2 |   |   |

| Parallel Transmission | | | | | | | | | | | | | | | | | | | | | | | | |
|---|---|---|---|---|---|---|---|---|---|---|---|---|---|---|---|---|---|---|---|---|---|---|---|---|
| Upper Band | 8 | 10 | 12 | 14 | 9 | 11 | 3 | 8 | 10 | 12 | 14 | 9 | 11 | 3 | 8 | 10 | 12 | 14 | 9 | 11 | 3 |
| Lower Band | 1 | 3 | 5 | 7 | 2 | 4 | 6 | 1 | 3 | 5 | 7 | 2 | 4 | 6 | 1 | 3 | 5 | 7 | 2 | 4 | 6 |

Fig. 10

SCALABLE ULTRA-WIDE BAND COMMUNICATION SYSTEM

RELATED APPLICATIONS

This application is a Continuation-In-Part of, and claims priority to, U.S. application Ser. No. 10/389,789, filed on Mar. 17, 2003, which application is hereby incorporated herein by reference in its entirety.

Additionally, this application claims priority to U.S. Provisional Application No. 60/404,070 filed on Aug. 16, 2002, and to U.S. Provisional Application No. 60/450,737, filed on Feb. 28, 2003, both of which applications are hereby incorporated herein by reference in their entirety. Furthermore, this application is related to U.S. application Ser. No. 10/603,372, filed on Jun. 25, 2003, and U.S. Application No. 10/643,108, filed on Aug. 18, 2003, entitled, "System and Method for Multi-Band Ultra-wide Band Signal Generators," both of which applications are hereby incorporated herein by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

This invention relates in general to communication methods, systems, and apparatuses, and in particular to ultra-wide band based wireless communication methods, systems, and apparatuses.

The demand for short to medium range, high speed connectivity for multiple digital devices in a local environment continues to rise sharply. For example, many workplaces and households today have many digital computing or entertainment devices such as desktop and laptop computers, television sets and other audio and video devices, DVD players, cameras, camcorders, projectors, handhelds, and others. Multiple computers and television sets, for instance, have become common in American households. In addition, the need for high speed connectivity with respect to such devices is becoming more and more important. These trends will inevitably increase even in the near future.

As the demand for high speed connectivity increases along with the number of digital devices in typical households and workplaces, the demand for wireless connectivity naturally grows commensurately. High-speed wiring running to many devices can be expensive, awkward, impractical and inconvenient. High speed wireless connectivity, on the other hand, offers many practical and aesthetic advantages, which accounts the great and increasing demand for it. Ideally, wireless connectivity in a local environment should provide high reliability, low cost, low interference caused by physical barriers such as walls or by co-existing wireless signals, security, and high speed data transfer for multiple digital devices. Existing narrowband wireless connectivity techniques do not provide such a solution, having problems such as high cost, unsatisfactory data transfer rates, unsatisfactory freedom from signal and obstacle related interference, unsatisfactory security, and other shortcomings. In fact, the state of the art does not provide a sufficiently satisfactory solution for providing high speed wireless connectivity for multiple digital devices in a local environment.

The state of the art in wireless connectivity generally includes utilization of spread spectrum systems for various applications. Spread spectrum techniques, which spread a signal over a broad range of frequencies, are known to provide high resistance against signal blocking, or "jamming," high security or resistance against "eavesdropping, " and high interference resistance. Spread Spectrum techniques have been used in systems in which high security and freedom from tampering is required. Additionally, Code Division Multiple Access (CDMA), a spread spectrum, packet-based technique, is used in some cellular phone systems, providing increased capacity in part by allowing multiple simultaneous conversation signals to share the same frequencies at the same time.

Known spread spectrum and modulation techniques, including CDMA techniques, direct sequence spread spectrum (DSSS) techniques, time hopping spread spectrum (THSS) techniques, and pulse position modulation (PPM) techniques, do not satisfactorily provide wireless connectivity in a local environment, including high reliability, low cost, low interference, security, and high speed data transfer for multiple digital devices. In addition, known UWB transmission and communication methods and systems lack satisfactory quality in areas that can include flexibility, adaptivity and adaptive trade-off capabilities in areas such as power usage, range, and transfer rates, and low cost implementation.

A number of U.S. and non-U.S. patents and patent applications discuss spread spectrum or UWB related systems for various uses, but are nonetheless in accordance with the above described state of the art. The U.S. and non-U.S. patents and patent applications discussed below are hereby incorporated herein by reference in their entirety.

There are several Japanese patents and applications in some of these areas. Japanese patent application JP 11284599, filed on Mar. 31, 1998 and published on Oct. 15, 1999, discusses spread spectrum CDMA mobile communications. Japanese patent application JP 11313005, filed on Apr. 27, 1998 and published on Nov. 9, 1999, discusses a system for rapid carrier synchronization in spread spectrum communication using an intermittently operative signal demodulation circuit. Japanese patent application JP 11027180, filed on Jul. 2, 1997 and published on Jan. 29, 1999, and counterpart European application EP 0889600 discuss a receiving apparatus for use in a mobile communications system, and particularly for use in spread spectrum Code Division Multiple Access communications between a base station and a mobile station. Japanese patent application JP 21378533, filed on Nov. 18, 1988 and published on May 25, 1990, discusses a transmitter for spread spectrum communication.

A number of U.S. patents and published applications discuss spread spectrum or UWB in various contexts. U.S. Pat. No. 6,026,125, issued Feb. 15, 2000 to Larrick, Jr. et al., relates to utilization of a carrier-controlled pulsed UWB signal having a controlled center frequency and an adjustable bandwidth. U.S. Pat. No. 6,351,652, issued Feb. 6, 2002 to Finn et al., discusses impulse UWB communication. U.S. Pat. No. 6,031,862, issued Feb. 29, 2000 to Fullerton et al., and related patents including U.S. Pat. Nos. 5,677,927, 5,960, 031, 5,963,581, and 5,995,534, discuss a UWB communications system in which impulse derived signals are multiplied by a template signal, integrated, and then demodulated, to increase the usability if signals which would otherwise be obscured by noise. U.S. Pat. No. 6,075,807, issued Jun. 13, 2000 to Warren et al., relates to a spread spectrum digital matched filter. U.S. Pat. No. 5,177,767, issued Jan. 5, 1993 to Kato, discusses a "structurally simple" wireless spread spectrum transmitting or receiving apparatus which is described as eliminating the need for code synchronization. U.S. Pat. No. 6,002,707, issued Dec. 14, 1999 to Thue, relates to radar system using a wide frequency spectrum signal for radar transmission to eliminate the need for very high energy narrow pulse transmitter and receiver systems. U.S. Pat. No. 5,347,537, issued Jun. 21, 1994 to Mori, et al., and related patents including U.S. Pat. Nos. 5,323,419 and 5,218,620, discuss a direct sequence spread spectrum transmitter and receiver system. U.S. Pat. No. 5,206,881, issued Apr. 27, 1993, discusses a spread spectrum communication system attempting to use rapid synchronization of pseudonoise code signals with data packet signals.

A number of published PCT international applications also discuss spread spectrum or UWB in various contexts. PCT international application, publication number WO 01/39451 published on May 31, 2001, discusses a waveform adaptive transmitter for use in radar or communications applications. PCT international application, publication number WO 01/93441, published on Dec. 6, 2001, discusses a UWB high-speed digital communication system using wavelets or impulses. PCT international application, publication number WO 01/99300, published on Dec. 27, 2001, discusses wireless communications using UWB signaling. PCT international application, publication number WO 01/11814, published on Feb. 15, 2001, discusses a transmission method for broadband wired or wireless transmission of information using spread spectrum technology.

In accordance with all of the above, there is a need in the art for an improved communication methods and systems. Additionally, there is a need in the art for methods and systems to provide wireless connectivity between multiple digital devices in a local environment.

SUMMARY OF THE INVENTION

In one embodiment, the invention provides a method for transmitting information using ultra-wide band transmission. The method includes allocating, for signal transmission, each of a plurality of frequency sub-bands. The method further includes sending an ultra-wide band transmission including the information by transmitting a signal over each of the plurality of frequency sub-bands. The method further includes allowing variation of at least one transmission parameter to facilitate trade-off between at least two of power consumption, energy collection, bit rate, performance, range, resistance to multiple access interference, and resistance to multipath interference and spectral flatness.

In another embodiment, the invention provides a method for receiving information using ultra-wide band transmission. The method includes allocating, for signal transmission, each of a plurality of frequency sub-bands. The method further includes receiving an ultra-wide band transmission including the information by receiving signals transmitted over each of the plurality of frequency sub-bands. The method further includes allowing variation of at least one of one or more reception parameters to facilitate trade-off between at least two of power consumption, energy collection, bit rate, performance, range, resistance to multiple access interference, and resistance to multipath interference and spectral flatness.

In another embodiment, the invention provides a method for communicating information using ultra-wide band transmission and reception. The method includes allocating, for signal transmission, each of a plurality of frequency sub-bands. The method further includes sending an ultra-wide band transmission including the information by transmitting a signal over each of the plurality of frequency sub-bands. The method further includes receiving an ultra-wide band transmission including the information by receiving signals transmitted over each of the plurality of frequency sub-bands. The method further includes allowing variation of at least one of one or more transmission parameters and one or more reception parameters to facilitate trade-off between at least two of power consumption, energy collection, bit rate, performance, range, resistance to multiple access interference, and resistance to multipath interference and spectral flatness.

In another embodiment, the invention provides a method for transmitting information using ultra-wide band transmission. The method includes allocating, for signal transmission, each of a plurality of frequency sub-bands. The method further includes sending an ultra-wide band transmission including the information by transmitting a signal over each of the plurality of frequency sub-bands. The method further includes setting at least one transmission parameter to facilitate a desired trade-off between at least two of power consumption, energy collection, bit rate, performance, range, resistance to multiple access interference, and resistance to multipath interference and spectral flatness.

In another embodiment, the invention provides a method for transmitting information using ultra-wide band transmission. The method includes allocating, for signal transmission, each of a plurality of frequency sub-bands. The method further includes sending an ultra-wide band transmission including the information by transmitting a signal over each of the plurality of frequency sub-bands. The method further includes varying pulse repetition frequency to facilitate trade-off between at least two of power consumption, energy collection, bit rate, performance, range, resistance to multiple access interference, and resistance to multipath interference and spectral flatness.

In another embodiment, the invention provides a method for transmitting information using ultra-wide band transmission, the method includes allocating, for signal transmission, each of a plurality of frequency sub-bands. The invention further includes sending an ultra-wide band transmission including the information by transmitting a signal over each of the plurality of frequency sub-bands. The method further includes setting pulse repetition frequency to mitigate inter-symbol interference.

In another embodiment, the invention provides a method for transmitting information using ultra-wide band transmission. The method includes allocating, for signal transmission, each of a plurality of frequency sub-bands. The method further includes sending an ultra-wide band transmission including the information by transmitting a signal over each of the plurality of frequency sub-bands. The method further includes allowing variation of pulse repetition frequency to facilitate trade-off between at least two of power consumption, energy collection, bit rate, performance, range, and resistance to multipath interference and spectral flatness.

In another embodiment, the invention provides a system for communicating information using ultra-wide band transmission and reception. The system includes a transmitter for sending an ultra-wide band transmission including the information by transmitting a signal over each of a plurality of frequency sub-bands. The system further includes a receiver for receiving an ultra-wide band transmission including the information by receiving signals transmitted over each of a plurality of frequency sub-bands. The system allows for at least one of selection of and variation of at least one of one or more transmission parameters and one or more reception parameters to provide adaptive trade-off between at least two of power consumption, bit rate, performance, range, and resistance to multipath interference and spectral flatness.

Additional aspects of the present invention will be apparent in view of the description which follows.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 7 is a chart of frequency hopping sequences for avoiding collisions on multiple pico-nets;

FIG. 8 is a chart of frequency hopping sequences for sequences for avoiding collisions on multiple pico-nets using half and one-third PRF;

FIG. 9 is a chart showing frequency hopping sequences sequences for avoiding collisions on multiple pico-nets using reduced PRF;

FIG. 10 is a chart showing two frequency hopping sequences that may be transmitted in parallel;

DETAILED DESCRIPTION

Figure 1:
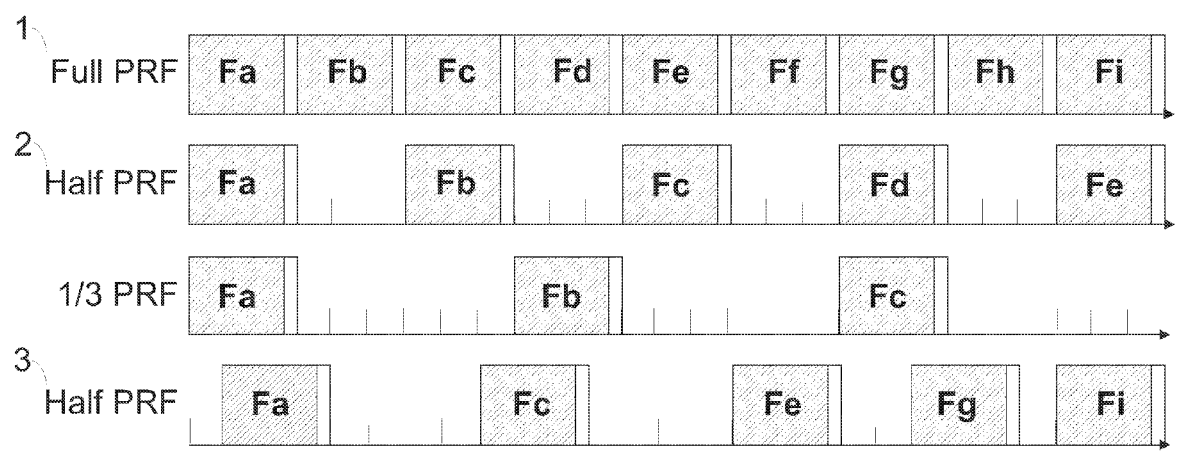
FIG. 1 is a timing diagram of signals transmitted using various levels of PRF reduction.

In some embodiments, the present invention provides a multi-band ultra-wide band (UWB) communication system capable of adaptively and scalably supporting different applications with different requirements, as well as different desired or ideal properties relating to the communications. The various requirements or ideal properties may involve parameters such as power consumption, performance, range, and resistance to multipath interference and spectral flatness. In some embodiments, in such a system, optimizing for one parameter may include tradeoffs in other parameters. For example, an UWB communication system can require either a low range or a high range, in addition, or may call for or ideally include low power consumption or high power consumption. UWB is scalable and therefore well suited to allowing for the parameter tradeoffs. In some embodiments, multi-band UWB facilitates allowing for such parameter tradeoffs.

In some embodiments, in a multi-band UWB communications system, at least one transmission or reception parameter in a multi-band UWB communications system, such as pulse repetition frequency utilized in transmission, can be set or varied to provide the ability to tune the relevant parameters for a given application. Such transmission or reception parameters can be set according to requirements, or ideal or desired properties, for a particular application. Alternatively, such transmission and reception parameters may be varied by the system in order to adapt to varying application requirements, or ideal or desired properties. For example, in some embodiments, the transmission or reception parameters can be varied automatically by the communications system, such as by the use of an algorithm.

A scalable multi-band UWB communication system allows for tradeoffs between parameters such as complexity, power consumption, performance and bit-rate. In addition, a scalable UWB system can perform these tradeoffs while retaining the collision avoidance properties of the frequency hopping sequences.

In multi-band UWB systems that may span multiple pico-nets, it may be advantageous for each pico-net to utilize a different frequency hopping sequence. That is, the order of the bands on which each pico-net transmits is different. This technique provides advantages including avoiding collisions between signals originating from different pico-nets.

In some embodiments, in a scalable UWB system, signals may be transmitted on multiple bands using a burst symbol cycle, or discontinuous, transmission scheme. A burst symbol cycle transmission includes an ON period during which one or more symbols are transmitted, and an off period during which no signal is transmitted. Further details regarding burst symbol cycles and burst symbol cycle transmission can be found in previously incorporated by reference U.S. application Ser. No. 10/603,372, filed on Jun. 25, 2003. The transmission, however, viewed as a whole over the entire range of bands may appear to be continuous even though the signals being transmitted over one or more individual sub-bands may be discontinuous. Alternatively, the transmission viewed as a whole over the entire range of sub-bands may itself be discontinuous, in addition to the signal transmissions over particular sub-bands being discontinuous.

In the embodiment seen in FIG. 1, the transmitted signal 1 is comprised of various frequencies Fa, Fb, etc., yet viewed as a whole appears nearly continuous. Increasing the space between transmissions across bands by varying the pulse repetition frequency (PRF) facilitates various tradeoffs between parameters while maintaining the collision avoidance properties of the frequency hopping sequences. In FIG. 1 the transmitted signal 3 illustrates one embodiment of decreasing the PRF, where only every other signal is transmitted, thereby spacing out the signals within the entire transmission.

In some embodiments, varying the PRF can be accomplished by dropping certain transmitted signals. For example, in a pulse transmission scheme utilizing half PRF, every other pulse from the full PRF signal can be skipped. That is, if the original signal transmits a pulse on frequencies fa, fb, fc, fd, and fe in that order; the half PRF transmission will transmit pulses only on fa, fc, and fe and remain silent for the time allocated for transmitting on fb and fd and in the next cycle pulses will be only on fb and fd. In another embodiment, the entire spectrum may be utilized with additional delay added between the same frequencies, as in FIG. 1 signal 2. As in the previous example, if the full PRF transmission occurs on fa, fb, fc, fd, etc. in that order, the half PRF may utilize all the frequencies and add an additional silent time between the transmissions. The technique of varying the PRF is not limited to pulse transmissions. In other embodiments, transmissions utilizing OFDM, QPSK, or other modulation schemes may utilize and benefit from varying the PRF.

Varying the PRF impacts the bit-rate of the transmitted signal. Since signals are transmitted at a lower rate in a decreased PRF scenario, the system must adjust to maintain the same bit-rate as the full PRF scenario. In some embodiments, the system may decrease the amount of bits utilized for spreading or coding. This enables the effective bit-rate to remain the same but may impact performance. In other embodiments, the amount of coding or spreading can remain constant and the effective bit-rate will be reduced. In another embodiment, some combination of reduction of bit-rate, coding and spreading may be used to reach a desired level of bit-rate and performance.

In some embodiments, varying the PRF may be accomplished through any combination of on and off periods within the frequencies in a sequence. Half PRF, for example, may be accomplished by having an off period in every other frequency in the sequence. Alternatively, in other embodiments, half PRF could entail having two frequencies on followed by two frequencies off. Other embodiments may have other combination of on and off periods.

Varying the PRF provides advantages to the scalable UWB system. The following is a description of some of the advantages provided.

Figure 1A:
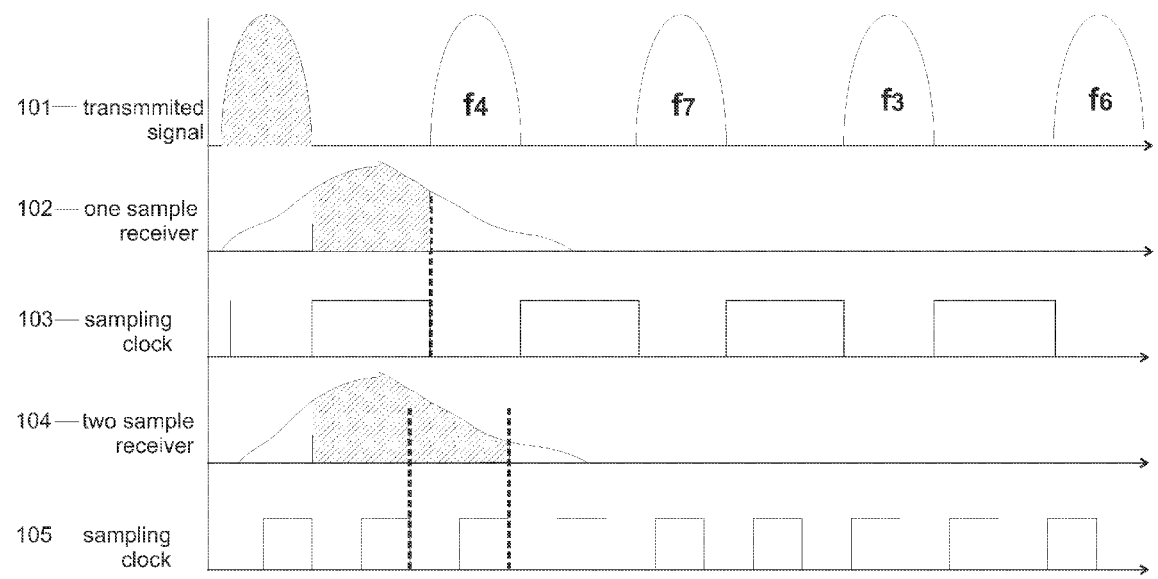
FIG. 1A is a timing diagram showing energy collection by a receiver.

Decreasing the PRF improves the energy collection properties of the receiver. In one embodiment, a full PRF system with one receiver chain has a limited time to collect energy transmitted on a particular frequency before it is required to switch to the next frequency. To increase energy collection in a full PRF system, an additional receiver chain is needed. Increased energy collection could then be accomplished through operating each chain in parallel on alternating frequencies. With reference to FIG. 1A, in a half PRF system, the transmitted signal 101 is available to the receiver chain for a longer amount of time. Therefore, for example, the energy in f1 can be collected, in the one receiver chain case 102, until the start of the transmission of the next frequency f4.

In some embodiments, energy collection may be improved by increasing the number of receiver chains. In one embodiment, having one receiver chain per frequency will allow for longer energy collection times. In other embodiments, there may be fewer chains than the number of frequencies and the chains may need to collect energy on more than one frequency.

In some embodiments, instead of increased energy collection, the receiver chain may shut down during the quiet time, thereby reducing power consumption. In some embodiments, power consumption may also be reduced at the transmitter by shutting off during the periods between the transmitted signals.

In some embodiments, an ADC bit number, or other properties or parameters relating to transmisstion or reception, are varied based on variation in the application or variation in environmental requirements.

In some embodiments, when the symbol length is long, such as an OFDM symbol, the system may achieve greater power efficiency compared to a pulsed system. In the case of long symbols, there is less overhead for on and off switching times.

Multiband UWB itself provides some protection against inter-symbol interference (ISI). By spacing out the usage of similar frequencies, sufficient time may exist between the repetition of frequencies as to avoid ISI. In certain situations, for example, where the channel response is long, there may not be enough time between repetition of the same frequency to avoid ISI.

Figure 2:
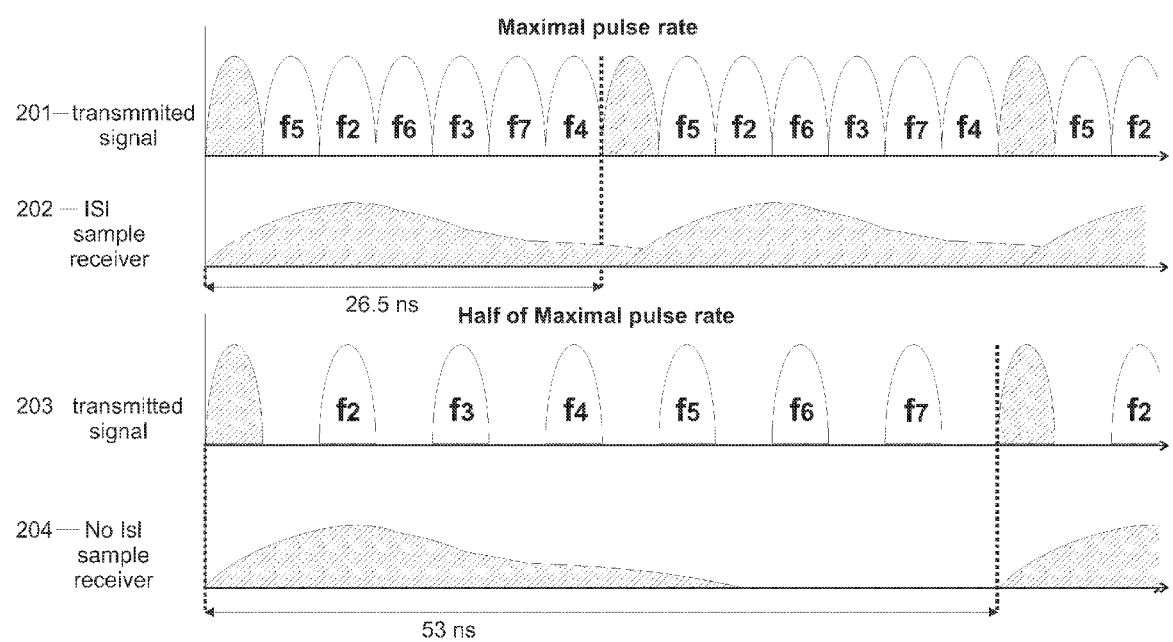
FIG. 2 is a timing diagram showing inter-symbol interference in transmitted signals.

With reference to FIG. 2, decreasing the PRF may help mitigate ISI effects. The transmitted signal 201 repeats f1 every seven pulses. The channel effects elongate the signal seen at the receiver 202 so that received signal collides with the next signal on the same frequency. By transmitting at half PRF 203, and spacing out the transmitted pulses, the collision at the receiver 204 is avoided.

This situation is particularly relevant to pulse transmissions where the signal transmission time is much shorter than the effects of the channel. In longer transmission schemes such as OFDM, the beneficial effects of decreased PRF can be seen in cases where transmissions on one frequency may leak into another frequency transmitted close in time. In some embodiments, reducing the PRF can mitigate the cross band inference.

Similar to the benefits achieved for ISI mitigation, variable PRF may also enable the more efficient use of notch filters. Notch filters may be used, in some embodiments, to filter out narrow-band interferers. In these embodiments, the signal may get spread out over time due to the effects of the filter, similar to channel effects that elongate the signal. Decreasing the PRF enables the receiver to better handle the effects of the notch filter.

In some embodiments, reducing the PRF increases the selectivity against narrowband interference by increasing the integration period and/or by using equalization techniques. The increased time provided by reducing the PRF may also allow for greater frequency selectivity with the filter. The improvement, due to decreasing the PRF, may, in some embodiments, allow the filter to be implemented on chip.

In some embodiments, which use a longer symbol, such as OFDM, narrow band filtering and DC filtering may be more easily achieved.

In one embodiment the notch filter is implemented on chip and is implemented using active elements with adaptive calibration. The filter is well integrated in the receiver chain, has low attenuation, and is highly phase linear in the adjacent sub-bands.

Reducing the PRF helps, in some embodiments, mitigate the effects of multipath interference between pico-nets. In some embodiments, each pico-net utilizes a distinct frequency hopping sequence. This is done to avoid collisions when the same frequency is used by two or more pico-nets. In systems that use high pulse rate transmissions, the frequencies may get spread across a longer time due to channel effects and multipath interference.

Figure 3:
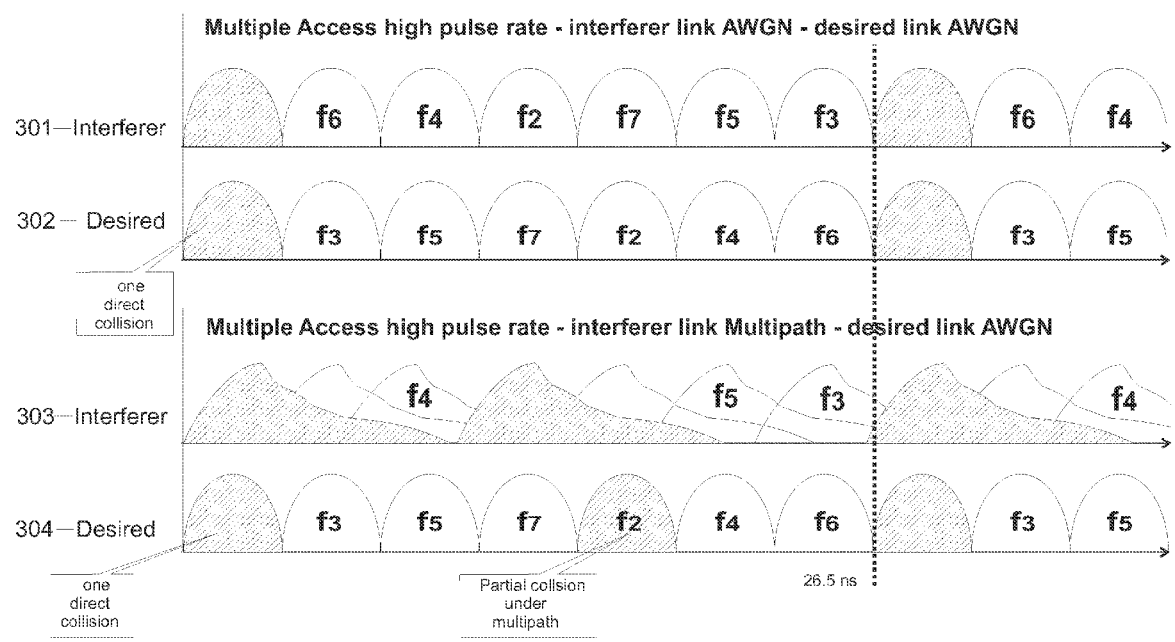
FIG. 3 is a timing diagram showing multiple access interference in transmitted signals.

With reference to FIG. 3, transmissions are shown on two pico-nets a desired and an interferer. When there are no adverse channel or multipath effects, the interferer 301 and the desired transmission 302 may collide at only one frequency, f1. If, however, the interferer 303 is elongated due to multipath interference or channel effects, then collisions may occur in multiple frequencies, such as f1 and f2.

Figure 4:
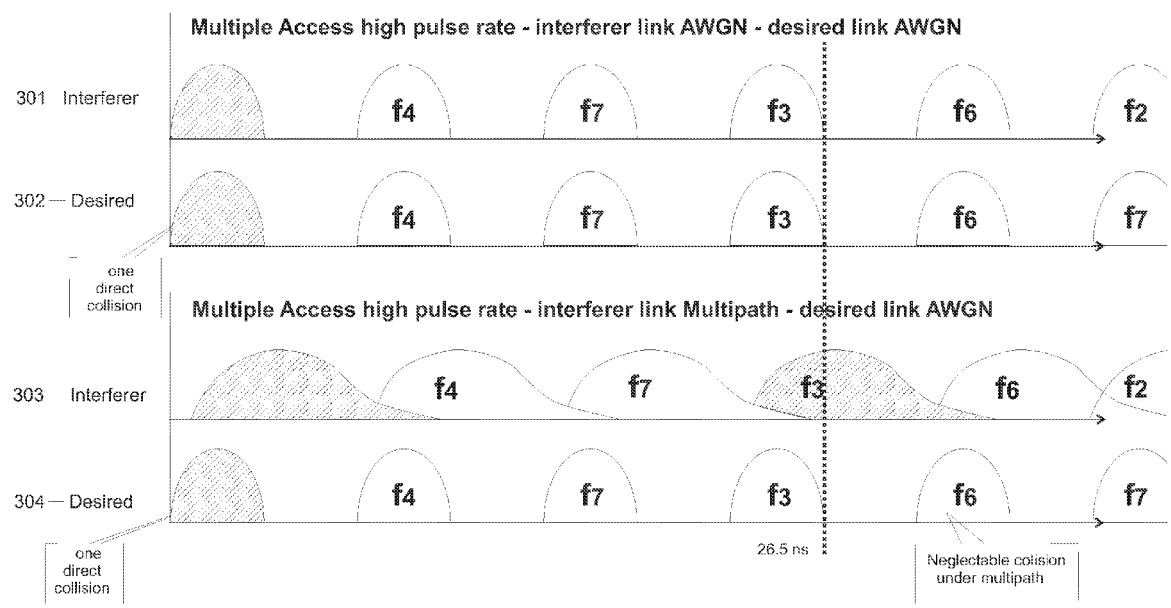
FIG. 4 is a timing diagram showing multiple access interference in transmitted signals.

Decreasing the PRF, as shown in FIG. 4, mitigates the effects of the multipath interference and channel effects. Both the desired transmission 401 and the interferer 402 are transmitted with half PRF. With no channel effects or interference there is only one potential collision, here, f1. With multipath interference on the interferer 403, the half PRF reduces the collision so that it only affects one signal on the desired transmission 404.

In transmission schemes that utilize longer symbols, for example, OFDM, the channel effects and multipath interference are not as relevant. Using longer symbols for each transmission may provide benefits to an ultra-wide band system, as the channel response length will become less significant compared to the symbol length. This may mitigate effects of multiple access interference and the increased symbol length may improve energy collection. Certain embodiments may use OFDM transmission for longer symbols, while other embodiments may use other transmission schemes.

Figure 5:
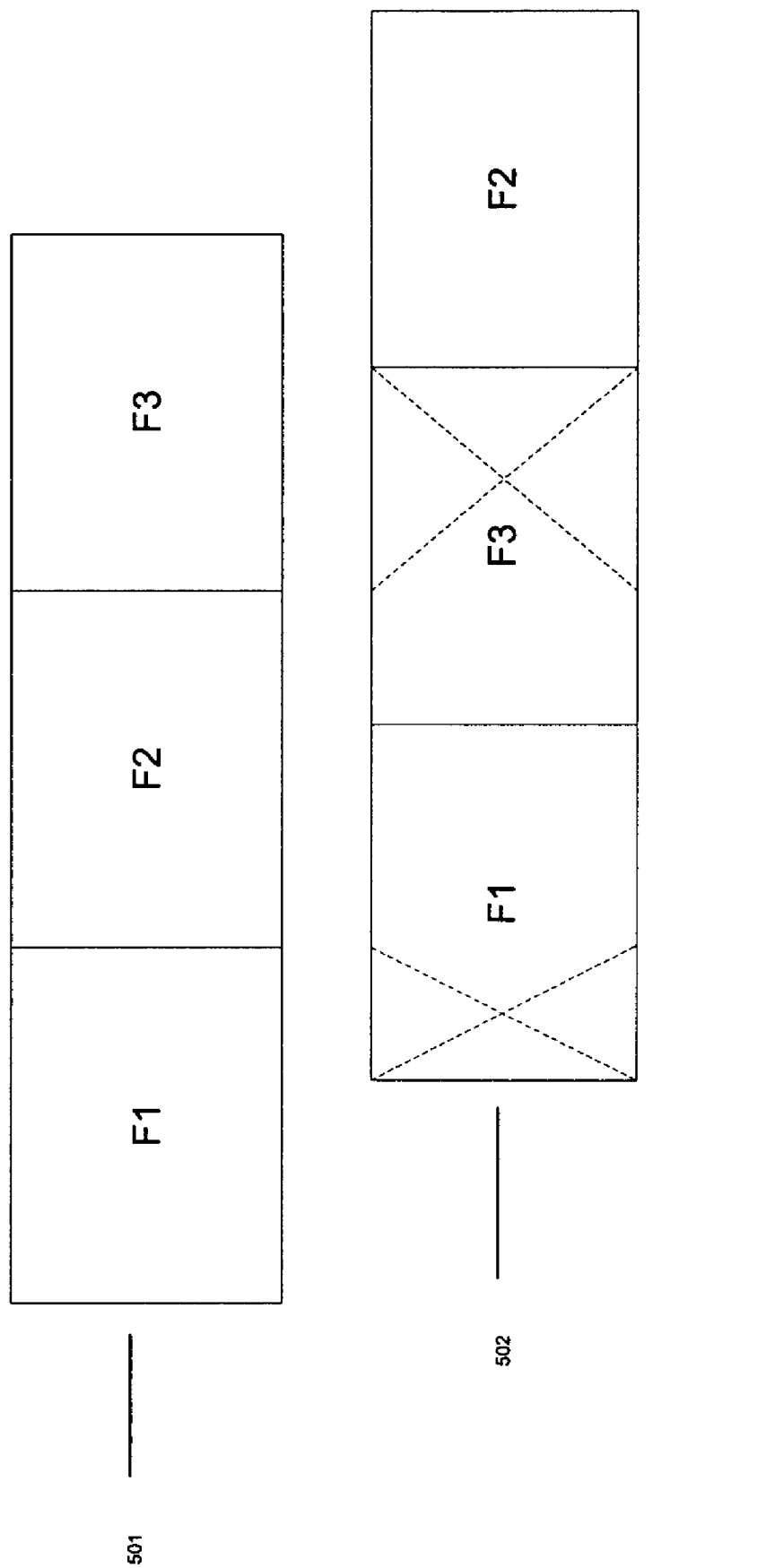
FIG. 5 is a timing diagram showing possible collisions between two signals.
Figure 6:
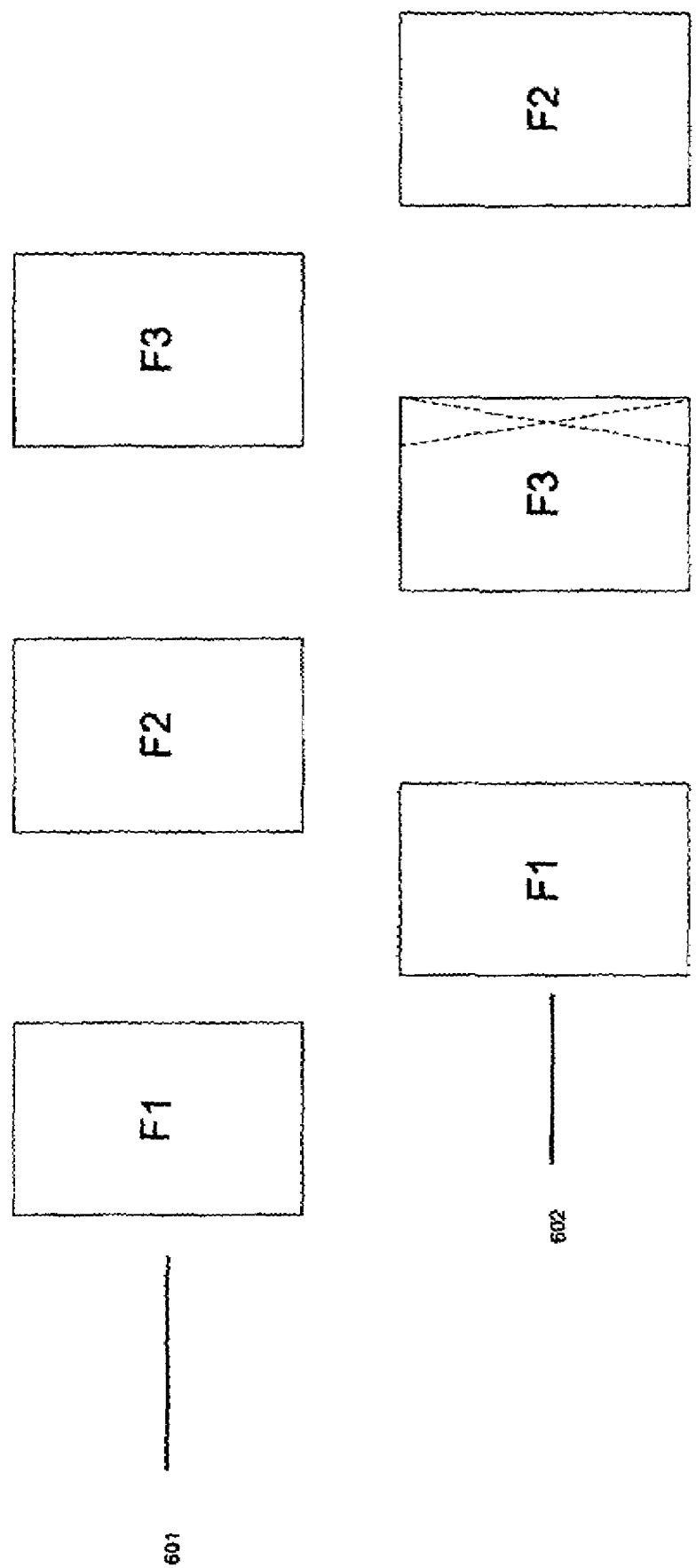
FIG. 6 is a timing diagram showing possible collisions between two signals.

In addition to aforementioned benefits, reducing the PRF reduces multiple symbol interference. In some embodiments, multiple pico-nets may be uncoordinated and will not have aligned phases. In such cases interference may occur across pico-nets in partial symbols such as half symbols or one-third symbols. FIG. 5 illustrates a half collision between frequencies F1 and F3 in two pico-net transmissions 501 and 502, where two out of three symbols may be lost. Using half PRF such collisions may be avoided. In FIG. 6 two signals, 601 and 602, are shown. With the reduced PRF, only one symbol collision out of three is possible.

Limiting the number of collisions allows different pico-nets to operate in closer proximity to one another. Since interference between symbols is minimized, minor collisions are removed that would have disrupted transmission on near systems.

The benefits listed above present tradeoffs in parameters that may be useful in certain embodiments of the invention. In some embodiments, the system may choose how to tune the parameters and the level of PRF reduction based on levels set by the application. In other embodiments, the system may be adaptive and sense the need for certain parameters during use and change accordingly.

In some embodiments, additional scalability may be added to a multi-band UWB system by using a variable number of bits in the A/D converter. This may help decrease power consumption. In the A/D, varying the bits would use less number of bits to represent a signal. Performance may be negatively affected in such a scenario.

In order to provide for collision avoidance in scenarios with multiple pico-nets, some embodiments use different frequency hopping sequences in each pico-net. Some embodiments of multi-band ultra-wide band use frequency hopping sequences comprised of seven frequencies, as described below. In order to enable variable PRF, in some embodiments, certain frequencies in each sequence are skipped in the first cycle while the others will be skipped in a second cycle, as described above. In other embodiments, it is possible to use a variable PRF with a different sequence or to insert space between the original frequency sequence. In some embodiments, the sequence may utilize more or less than seven frequencies.

With reference to FIG. 7, a set of sequences is shown. Each sequence s1 through s6 illustrates a frequency hopping sequence that may be utilized by a pico-net. In this example, the different sequences allow for six pico-nets to operate within the same vicinity while avoiding collisions between pico-nets. The set of frequencies illustrated in FIG. 7 has the property that, regardless of how the sequences are shifted relative to one another, there will only be at most one collision where multiple pico-nets are using the same frequencies.

Figure 9:
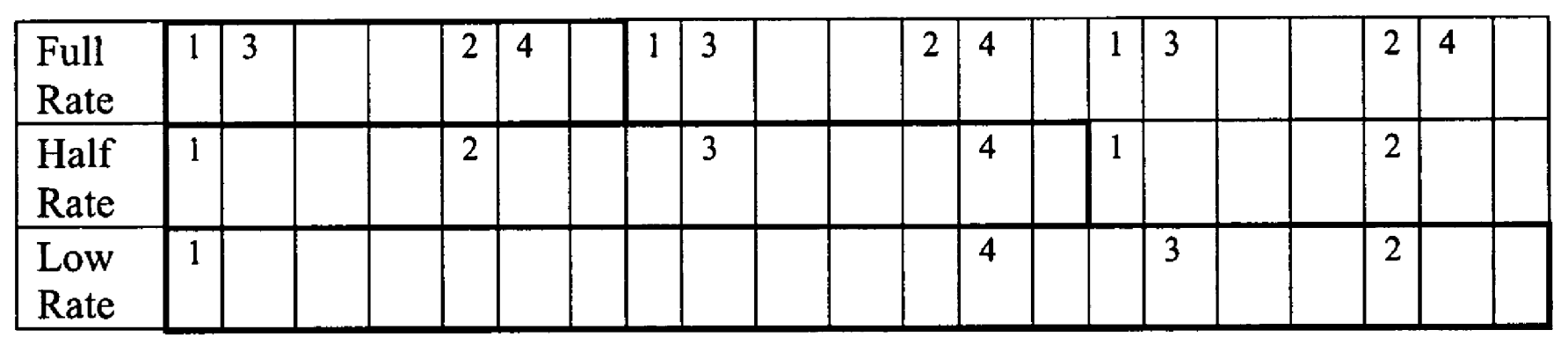

With reference to FIG. 8, the sequence from FIG. 7 is shown after switching to half PRF and one-third PRF. The half rate PRF and the low rate (one-third) PRF, in this embodiment, are facilitated by removing every other or leaving every third frequency, respectively. FIG. 9 shows another embodiment, where the sequences are comprised of 4 frequencies. This may be due to interference in certain bands or a limited bandwidth system. FIG. 10 illustrates an embodiment with 14 frequencies in the sequence where each transmitter transmits on two frequencies in parallel. Other embodiment may have a different number of frequencies.

Figure 11:
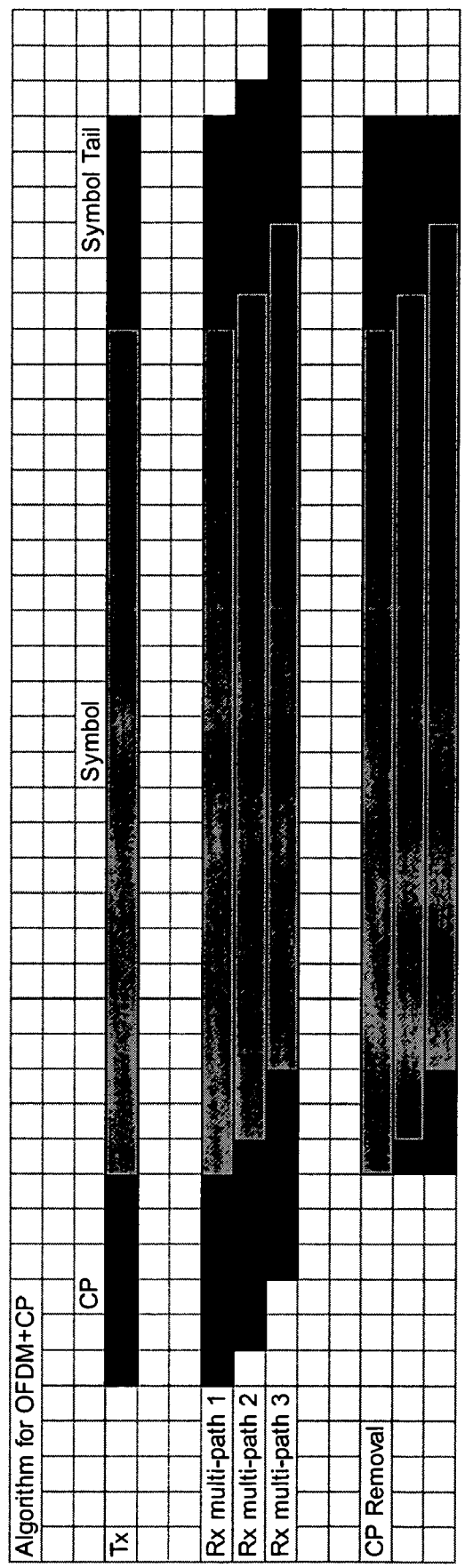
FIG. 11 is a graph showing signals transmitted using cyclic prefix.
Figure 12:
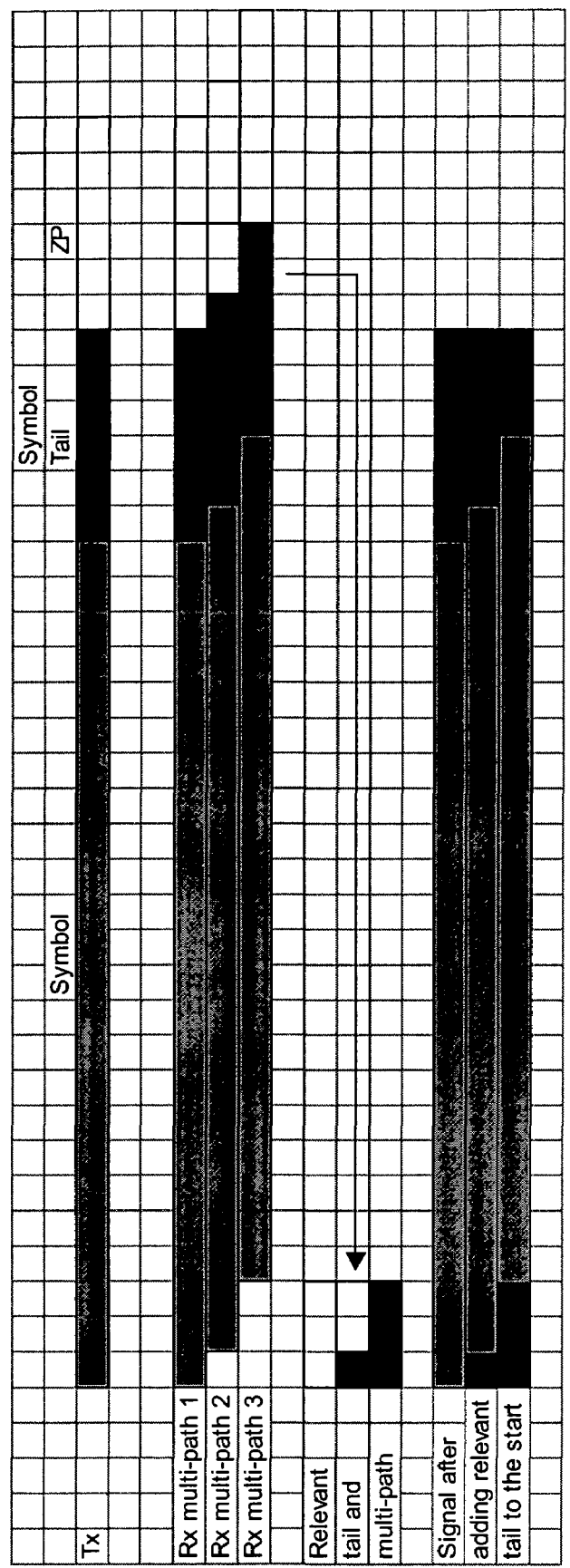
FIG. 12 is a graph showing signals transmitted using zero padding.
Figure 13:
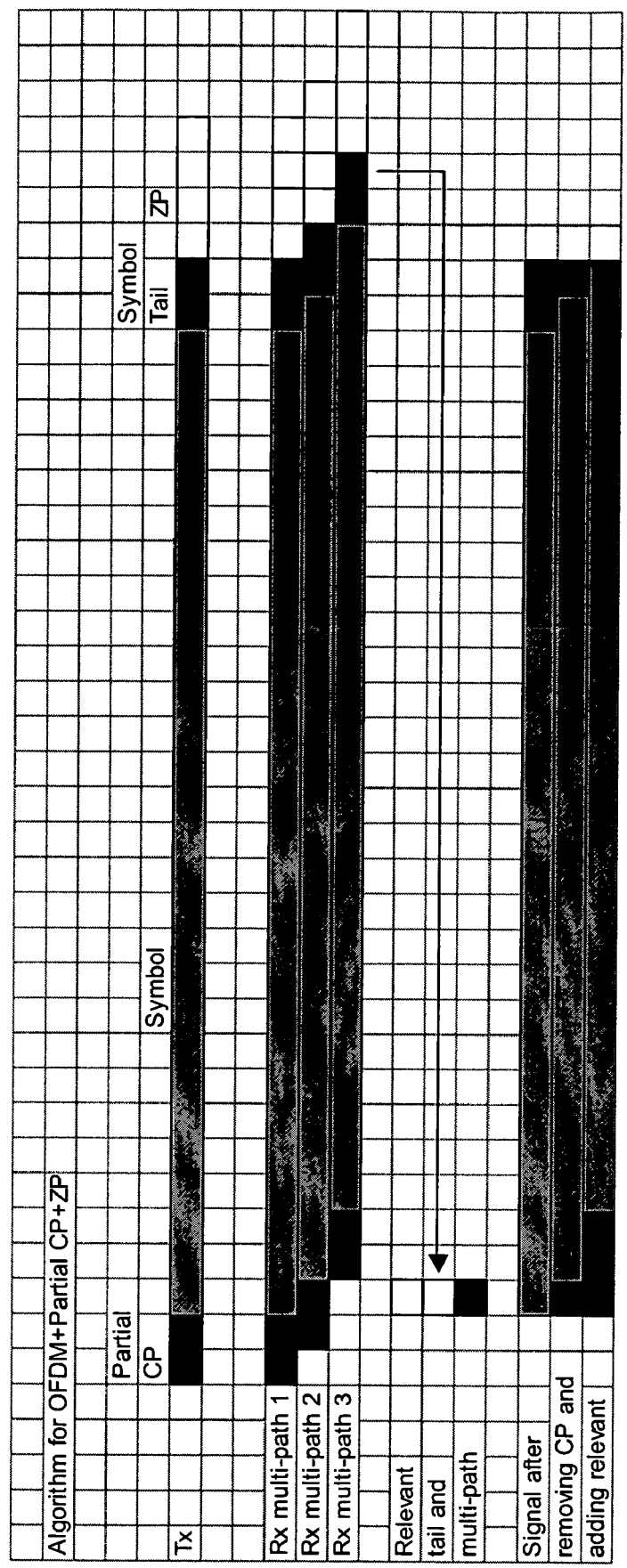
FIG. 13 is a graph showing signals transmitted using cyclic prefix and zero padding.

In transmitting multi-band UWB signals, some embodiments may use cyclic-prefix (CP) transmission, zero-padding (ZP) transmission or a combination of both. Embodiments that utilize OFDM transmissions may be particularly suited to use CP, ZP or both. FIG. 11 illustrates an algorithm for OFDM using CP. FIG. 12 illustrates the algorithm for OFDM using ZP. FIG. 13 illustrates an algorithm for OFDM using a combination of partial CP and ZP.

The invention claimed is:

1. A method for transmitting information using ultra-wide band transmission, the method comprising: sending, using orthogonal frequency division multiplexing, an ultra-wide band transmission comprising the information; and allowing variation of pulse repetition frequency by removing multiple frequencies from a frequency hopping sequence.

2. The method of claim 1, comprising allowing variation of pulse repetition frequency to facilitate trade-off between at least two of power consumption, energy collection, bit rate, performance, range, resistance to multiple access interference, and resistance to multipath interference and spectral flatness.

3. The method of claim 1, wherein sending an ultra-wide band transmission comprises sending a burst symbol cycle transmission.

4. The method of claim 1, comprising maintaining an effective bit rate.

5. The method of claim 1 comprising reaching a desired level of bit and rate and performance by maintaining a combination of reduction of bit rate, coding and spreading.

6. The method of claim 1, comprising allowing variation of at least one transmission parameter in order to adapt to varying application requirements.

7. The method of claim 6, comprising automatically varying at least one transmission parameter in order to adapt to at least one of varying application requirements and environment requirements.

8. The method of claim 6, comprising using one or more algorithms to facilitate varying at least one transmission parameter in order to adapt to at least one of varying application requirements and environment requirements.

9. The method of claim 1, wherein sending an ultra-wide band transmission comprises using at least one of cyclic prefix transmission, and a combination of cyclic prefix transmission and zero padding.

10. The method of claim 1, comprising allowing variation in time spreading, while sending identical information multiple times in a single sub-band as well as in different sub-bands.

11. The method of claim 1, wherein pulse repetition frequency is varied according to at least one of a particular application and a particular environment.

12. The method of claim 1, comprising adaptively varying pulse repetition frequency according to at least one of varying application requirements and varying environmental requirements.

13. The method of claim 1, comprising adaptively varying pulse repetition frequency using one or more algorithms.

14. The method of claim 1, comprising adaptively varying pulse repetition frequency.

15. The method of claim 1, comprising reducing pulse repetition frequency to increase filter selectivity.

16. The method of claim 1, wherein reducing pulse repetition frequency to increase notch filter selectivity allows a chip implementation of one or more filters.

17. The method of claim 1, comprising varying pulse repetition frequency to reduce cross-band interference.

18. The method of claim 1, comprising reducing pulse repetition frequency to mitigate interference between two or more pico-nets that each use a different frequency hopping sequence.

19. The method of claim 1, comprising reducing pulse repetition frequency by a factor of two by removing one out of every two consecutive frequencies.

20. The method of claim 1, comprising reducing pulse repetition frequency by a factor of three by removing one out of every three consecutive frequencies.

21. The method of claim 1, comprising using different frequency hopping sequences for each of multiple pico-nets.

22. The method according to claim 1 further comprising setting pulse repetition frequency to mitigate inter-symbol interference.

23. A method for receiving information using ultra-wide band transmission, the method comprising: receiving, using orthogonal frequency division multiplexing, an ultra-wide band transmission comprising the information by receiving signals transmitted over each of the plurality of frequency sub-bands; and allowing variation of received pulsed repetition frequency being introduced by removing multiple frequencies from a frequency hopping sequence.

24. The method of claim 23, comprising allowing variation of received pulse repetition frequency to facilitate trade-off between at least two of power consumption, energy collection, bit rate, performance, range, resistance to multiple access interference, and resistance to multipath interference and spectral flatness.

25. The method of claim 24, comprising reducing power consumption by shutting off the receiver at least one of during off periods, during anticipated redundant symbols, and during anticipated noisy symbols.

26. The method of claim 23, comprising varying an ADC bit number based on variation in at least one of an application and environmental requirements.

27. The method of claim 23, wherein receiving an ultra-wide band transmission comprises receiving a burst symbol cycle transmission.

28. The method of claim 23, comprising receiving burst symbol cycle signals over each of the frequency sub-bands.

29. The method of claim 28, wherein receiving an ultra-wide band transmission comprises receiving a burst symbol cycle transmission.

30. A system for communicating information using ultra-wide band transmission and reception, the system comprising: a transmitter for: sending an ultra-wide band transmission comprising the information by transmitting, using orthogonal frequency division multiplexing, a signal and allowing variation of pulse repetition frequency by removing multiple frequencies from a frequency hopping sequence; and a receiver for: receiving an ultra-wide band transmission comprising the information by orthogonal frequency division multiplexing receiving signals.

31. The system of claim 30, adapted to allow variation of pulse repetition frequency to facilitate trade-off between at least two of power consumption, energy collection, bit rate, performance, range, resistance to multiple access interference, and resistance to multipath interference and spectral flatness.

* * * * *